Feb. 9, 1932.　　　W. R. SMITTLE　　　1,844,047
PIPE JOINT
Filed Dec. 6, 1930

Inventor
W. R. Smittle
By Clarence A. O'Brien
Attorney

Patented Feb. 9, 1932

1,844,047

UNITED STATES PATENT OFFICE

WALTER R. SMITTLE, OF ST. LOUIS, MISSOURI

PIPE JOINT

Application filed December 6, 1930. Serial No. 500,612.

This invention relates to improvements in pipe joints and has for one of its important objects to provide, in a manner as hereinafter set forth, a device of this character embodying a novel construction and arrangement of parts whereby rotary movement of the connected pipes relative to each other will be permitted.

Another important object of the invention is to provide a pipe joint of the character described having mounted therein a novel packing which is adapted to render the joint leakproof.

Other objects of the invention are to provide a pipe joint which will be simple in construction, strong, durable, efficient and reliable in use, which may be expeditiously assembled and disassembled and which may be manufactured at low cost.
All of the foregoing and still further objects and advantages of the invention may become apparent from a study of the following specification, taken in connection with the accompanying drawings wherein like characters of reference designate corresponding parts throughout the several views, and wherein:—

Figure 1:
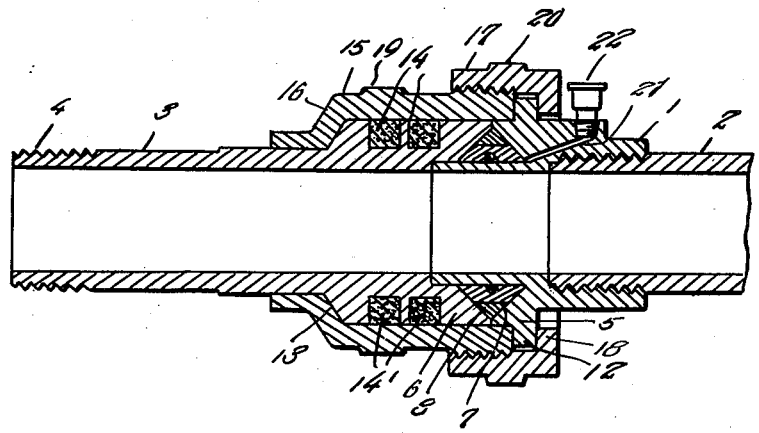
Figure 1 is a longitudinal sectional view through a joint constructed in accordance with this invention.
Figure 2:
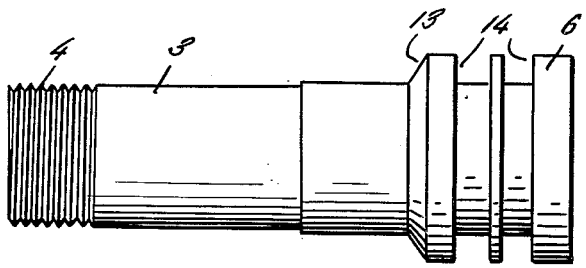
Figure 2 is a detail view in elevation of one of the elements constituting an essential part of the joint.
Figure 4:
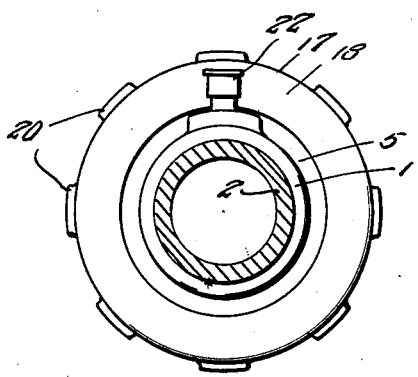
Figure 3:
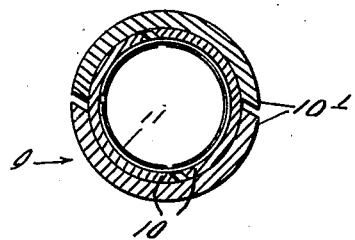
Figure 3 is a detail view in section through the split radially expansible sectional packing or sealing ring.

Figure 4 is a cross sectional view taken substantially on the line 4—4 of Figure 1 looking in the direction indicated by the arrows.
Referring to the drawings in detail, it will be seen that the reference numeral 1 designates a comparatively short male section which is provided with an enlarged internally threaded end portion to which the pipe 2 is threadedly connected. The opposite end portion of the male section 1 fits into one end portion of the female section 3 which has said one end portion of its inner periphery recessed for the reception of the male section 1. The opposite end portion of the female section 3 is externally threaded as indicated at 4 for connection with a pipe (not shown). The male section 1 has formed on an intermediate portion thereof a shoulder 5 for abutting engagement with the head 6 on the adjacent end of the female section 3. The adjacent sides of the shoulder 5 and the head 6 are undercut in a manner to provide beveled seats 7 and 8, respectively. An expansible packing of substantially triangular cross section is designated generally by the reference numeral 9 in Figure 3 of the drawings and is mounted on the male section 1 for engagement with the beveled seats 7 and 8. The packing comprises a sectional inner ring formed of a plurality of sections 10 having oppositely inclined or beveled sides and flat inner and outer peripheries and further having their abutting ends cut tangentially in the manner illustrated to advantage in Figure 3 of the drawings. The inner periphery of the inner ring is circumferentially grooved for the reception of a resilient expander spring 11 which yieldingly urges the sections 10 radially or outwardly. A sectional outer ring comprising the sections 10' of substantially triangular cross section is mounted on the inner ring, said sections 10' having their ends cut tangentially and disposed in staggered relation to the ends of the sections 10. The sections 10' are engageable with the seats 7 and 8.

An integral peripheral flange 12 is formed on the shoulder 5 in spaced relation to the end of the said shoulder which is adjacent the head 6 of the female section 3. The head 6 is formed to provide a beveled shoulder 13 on the female section 3. A plurality of circumferentially extending grooves or channels 14 are formed in the outer periphery of the head 6 for the reception of a suitable lubricant 14'.

A coupling sleeve 15 is mounted on the female section 3 and is provided with a reduced end portion 16 providing a shoulder for engagement on the shoulder 13 provided by the head 6 of the female section 3. The opposite end portion of the coupling sleeve 15 is externally threaded. The coupling sleeve 15 extends over the head 6 and the adjacent portion of the shoulder 5 of the male section 1 which is free of the flange 12 and one end of the coupling sleeve 15 abuts one side of the flange 12. The flange 12 is of smaller diameter than the coupling sleeve 15.

A coupling nut 17 is provided with an integral internal flange 18 in one end portion for engagement with the other side of the flange 12 and said coupling nut 17 is internally threaded to permit the same to be screwed on the coupling sleeve 15. As will be obvious, when the coupling nut 17 and the coupling sleeve 15 are screwed toward each other, the male section 1 and the female section 3 will be drawn together. To facilitate rotation of the members 15 and 17, a series of integral, spaced lugs 19 and 20 are provided for engagement by a suitable tool such as a spanner wrench. The coupling sleeve 15 may be retained against rotation by a suitable tool while the coupling nut 17 is being threaded thereon. An oil port or passage 21 is provided in the male section 1 for lubricating the packing from a grease cup or fitting 22 is removably threaded into said port or packing.

The expander spring 11 engages the packing 9 with the beveled seats 7 and 8 at all times in a manner to provide a leak-proof joint between the male and female sections 1 and 3, respectively, and it is, therefore, unnecessary to clamp the elements constituting the joint together under excessive pressure in order to provide a leak-proof joint. This comparatively loose arrangement or assemblage of the elements will permit relative rotary movement of the male and female sections 1 and 3 to relieve the pipes of torsional stress.

It is believed that the many advantages of a pipe joint in accordance with this invention will be readily understood, and although the preferred embodiment of the invention is as illustrated and described, it is to be understood that changes in the details of construction may be had which will fall within the scope of the invention as claimed.

What is claimed is:—

1. A pipe joint of the character described comprising a female section, a male section extending telescopically into one end portion of the female section, an integral shoulder on the male section, said shoulder and the female section being in end abutting engagement with each other, oppositely beveled seats on the abutting ends of the shoulder and the female section, and a radially expansible packing encircling the male section and engageable with the seats in a manner to provide a leak-proof joint between the sections.

2. A pipe joint of the character described comprising a female section, a male section extending telescopically into one end portion of the female section, an integral shoulder on the male section, said shoulder and the female section being in end abutting engagement with each other, oppositely beveled seats on the abutting ends of the shoulder and the female section, and a radially expansible packing encircling the male section and engageable with the seats in a manner to provide a leak-proof joint between the sections, said packing comprising inner and outer split rings, each including a plurality of concentric sections having tangential abutting ends, the sections comprising the outer ring being substantially triangular in cross section, the inner ring having its inner periphery provided with a circumferentially extending groove, and an expander spring mounted in the groove for yieldingly urging the sections outwardly to engage the outer sections against the beveled seats.

3. A pipe joint of the character described comprising a female section, a male section extending telescopically into one end portion of the female section, an integral head on said one end portion of the female section, an integral shoulder on an intermediate portion of the male section, said shoulder having one end in abutting engagement with one end of the head on the female section, the abutting ends of the shoulder and the head being undercut in a manner to provide oppositely beveled seats, a radially expansible packing encircling the male section and engageable with the beveled seats in a manner to provide a leak-proof joint between the sections.

4. A pipe joint of the character described comprising a female section, a male section extending telescopically into one end portion of the female section, an integral head on said one end portion of the female section, an integral shoulder on an intermediate portion of the male section, said shoulder having one end in abutting engagement with one end of the head on the female section, the abutting ends of the shoulder and the head being undercut in a manner to provide oppositely beveled seats, a radially expansible packing encircling the male section and engageable with the beveled seats in a manner to provide a leak-proof joint between the sections, said packing comprising a split ring including a plurality of concentrically arranged rigid sections having tangential ends disposed in abutting engagement, certain of said sections being substantially triangular in cross section, the ring being provided with a circumferential groove in its inner periphery, and an expander spring engaged in the groove for yieldingly urging the sections outwardly toward the beveled seats.

In testimony whereof I affix my signature.

WALTER R. SMITTLE.